C. E. WHITEHEAD.
NUT LOCK STRUCTURE.
APPLICATION FILED MAY 22, 1913.

1,075,617.

Patented Oct. 14, 1913.

WITNESSES
R. F. Dilworth
Geo. A. Harrison.

INVENTOR
Charles E. Whitehead,
by Edward A. Lawrence,
his Attorney

COLUMBIA PLANOGRAPH CO., WASHINGTON, D. C.

UNITED STATES PATENT OFFICE.

CHARLES E. WHITEHEAD, OF BELLEVUE BOROUGH, PENNSYLVANIA.

NUT-LOCK STRUCTURE.

1,075,617.  Specification of Letters Patent.  Patented Oct. 14, 1913.

Application filed May 22, 1913. Serial No. 769,128.

*To all whom it may concern:*

Be it known that I, CHARLES E. WHITEHEAD, a citizen of the United States, and residing in the borough of Bellevue, in the county of Allegheny and State of Pennsylvania, have invented or discovered new and useful Improvements in Nut-Lock Structures, of which the following is a specification.

My invention consists of a new and improved nut-lock. It is especially intended for railway-track work but may be equally well applied to all uses wherein it is important that the nut be prevented from accidental loosening or unscrewing from its bolt or seat.

The purpose in view is the production of a device of this character which is simple, inexpensive and durable, easy of adjustment and intentional loosening or removal, but which cannot be accidentally loosened or unscrewed as by the jar of passing trains or the vibration of machinery.

For the accomplishment of these ends I provide the structure herein shown and described.

Figure 1:
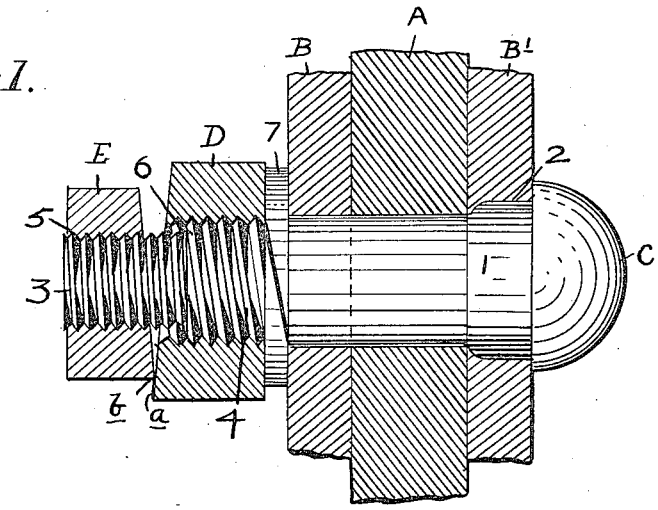
Figure 2:
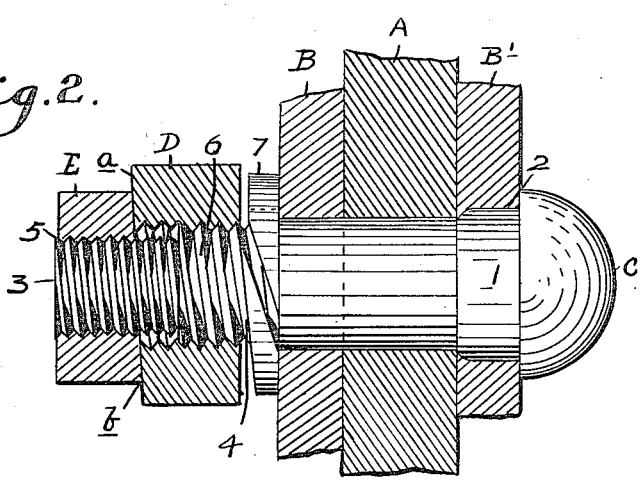
Figure 3:
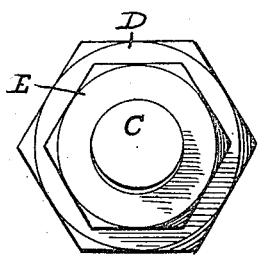

In the accompanying drawings, Figure 1 is a broken vertical cross-section of a railway rail and its two fish-plates held together by means of a bolt and nuts embodying my invention, the two nuts being shown in their relative position prior to interlocking; Fig. 2 is a similar view showing the two nuts locked together against accidental loosening or unscrewing, and Fig. 3 is an end view of the bolt showing the two nuts mounted thereon.

The following is a detailed description of the drawings.

A is a railway rail and B and B′ the two fish-plates by means of which ends of abutting rails are joined together in the usual practice.

C is a bolt which is inserted through registering holes in said rail and fish-plates, the inner shank 1 of bolt C being preferably oval to fit the countersunk oval depression 2 in the fish-plate B′, thus preventing the bolt from turning. The outer end of bolt C which protrudes from the fish-plate B has a larger diameter adjacent to said fish-plate and a smaller diameter adjacent to its extreme end. Thus the smaller diameter is shown at 3 and the larger diameter at 4. The smaller diameter is provided with threads 5 and the larger diameter with threads 6. Said threads are inclined in the same direction but the threads 5 are of less pitch than the threads 6; such for instance as in the ratio of $\frac{1}{16}$ to $\frac{1}{8}$ of an inch.

7 is a split-spring or other resilient washer mounted on the bolt C and abutting against the outer face of fish-plate B. The office of said washer is to exert an outward force upon the nut screwed up against it.

D is a nut having internal threads to screw up on the portion 4 of bolt C against the washer 7, the bore of said nut being preferably of sufficient length to prevent the shoulder formed on the bolt by its two diameters impinging against and limiting the movement of the outer nut E. The outer nut E is adapted to screw up on the threads 5 of the portion 3 of bolt C, and said nut is preferably smaller than the nut D so that the proper nut may be picked up and screwed on without a preliminary inspection or sorting out of the nuts. The abutting faces of the nuts D and E are inclined at an angle to their bore, which incline may be conveniently equal to the pitch of the threads of the portion 4 of the bolt.

The operation and use of my invention are as follows: After the rail A, the fish-plates B and B′ and the bolt C have been assembled in the usual manner, the washer 7 is mounted on the bolt C and the nut D is screwed up on threads 6 tightly against said washer, compressing the same snugly against the fish-plate B. The nut E is now screwed onto the threads 5 tightly against the nut D until blocked by said last named nut. In such case the maximum $a$ of the nut D will register with the maximum $b$ of the nut E. The nut D is now turned in the direction to unscrew the same until the maximum point $a$ of said nut D has passed into the rear of the maximum point $b$ of the nut E, thus locking said latter nut in place against accidental loosening, since, if an attempt is made to unscrew said nut E, said effort is resisted and defeated by the registration of the inclined faces of the two nuts. In Fig. 2 I have shown the nuts locked together having the minimum of one nut registering with the maximum of the other nut, but it will be understood that the retreat of the maximum of the nut D into the rear of the maximum of nut E is sufficient to lock the outer nut against unloosening. The spring washer 7 prevents the nut D being screwed up again upon the bolt C to release the nut E unless a wrench be applied to said nut D and the same be screwed up against said washer with sufficient force to compress the same into the position shown in Fig. 1. To loosen the outer nut E, all that is required is to forcibly screw up said inner nut D and compress the washer 7. The unscrewing of the inner nut will not carry the outer nut with it or loosen the same as the threads engaged by the two nuts are of different pitch, the outer nut moving more slowly in a direction longitudinal of the bolt per revolution, and therefore any unscrewing movement of the inner nut would only result in locking it more tightly against the outer nut. I prefer to make the nuts of polyhedral shape so that the maximum and minimum may be of less lateral extent.

It is evident from the above that unless a wrench be applied to nut D and the latter screwed forcibly up against the washer 7, compressing the same sufficiently to permit the maximum of the nut D to move into a position in advance of the maximum of nut E, said nut E is positively locked into place and will as positively prevent the further unscrewing of the nut D. Any attempt to unscrew the nut D will, owing to the difference in pitch of the two threads 5 and 6, result in more tightly locking the two nuts together and in their places.

What I desire to claim is:—

1. A nut-lock structure comprising a bolt with an end having two adjacent threaded portions of different diameters, the outer portion being of the less diameter and provided with threads of less pitch than those of the other threaded portion, and a pair of nuts adapted respectively to be screwed onto said two threaded portions and having their adjacent faces obliquely inclined and when said nuts are in their locked position the maximum of the inner nut being positioned in the rear of the maximum of the outer nut, for the purpose described.

2. A nut-lock structure comprising a bolt with an end having two adjacent threaded portions of different diameters, the outer portion being of the less diameter and provided with threads of less pitch than those of the other threaded portion, a pair of nuts adapted respectively to be screwed onto said two threaded portions and having their adjacent faces obliquely inclined and when said nuts are in their locked position the maximum of the inner nut being positioned in the rear of the maximum of the outer nut, and means for exerting a resilient outward force upon said inner nut, for the purpose described.

Signed at Bellevue, Penna., this 20th day of May, 1913.

CHARLES E. WHITEHEAD.

Witnesses:
E. A. LAWRENCE,
R. D. JENKINSON.

---

Copies of this patent may be obtained for five cents each, by addressing the "Commissioner of Patents, Washington, D. C."